(12) United States Patent
Bloch et al.

(10) Patent No.: US 6,481,525 B1
(45) Date of Patent: Nov. 19, 2002

(54) STEERING ARRANGEMENT FOR A VEHICLE

(75) Inventors: Jesper Bloch, Nordborg (DK); Ulla Toft Østergård, Aarhus (DK)

(73) Assignee: Sauer-Danfoss (Nordborg) A/S, Nordborg (DK)

( * ) Notice: Subject to any disclaimer, the term of this patent is extended or adjusted under 35 U.S.C. 154(b) by 0 days.

(21) Appl. No.: 09/701,058

(22) PCT Filed: Jun. 22, 1999

(86) PCT No.: PCT/DK99/00343

§ 371 (c)(1),
(2), (4) Date: Feb. 2, 2001

(87) PCT Pub. No.: WO99/67118

PCT Pub. Date: Dec. 29, 1999

(30) Foreign Application Priority Data

Jun. 23, 1998 (DE) ............................ 198 27 781

(51) Int. Cl.[7] ............................................... B62D 5/00
(52) U.S. Cl. ........................................ 180/402; 180/403
(58) Field of Search ....................... 446/454, 455, 446/456; 180/402, 442, 403, 167, 168, 169, 441; 701/41, 42

(56) References Cited

U.S. PATENT DOCUMENTS

| | | | | |
|---|---|---|---|---|
| 2,798,565 A | * | 7/1957 | Rosenthal et al. | |
| 3,022,850 A | * | 2/1962 | Bidwell et al. | |
| 4,421,336 A | * | 12/1983 | Petrofsky et al. | ........... 280/252 |
| 5,033,000 A | * | 7/1991 | Littlejohn et al. | ..... 364/424.05 |
| 5,035,439 A | * | 7/1991 | Petrillo | ....................... 280/81.6 |
| 5,195,920 A | * | 3/1993 | Collier | ....................... 446/409 |
| 5,322,140 A | * | 6/1994 | Bussinger | ................... 180/65.1 |
| 5,542,690 A | * | 8/1996 | Kozicki | .................... 280/304.1 |
| 5,653,304 A | * | 8/1997 | Renfroe | ....................... 180/402 |
| 5,725,412 A | * | 3/1998 | Ishimoto | ..................... 446/437 |
| 5,868,600 A | * | 2/1999 | Watanabe | .................... 446/460 |
| 5,871,386 A | * | 2/1999 | Bart et al. | ................... 446/460 |
| 6,054,831 A | * | 4/2000 | Moore et al. | ................ 318/581 |
| 6,100,811 A | * | 8/2000 | Hsu et al. | .............. 340/825.31 |
| 6,102,770 A | * | 8/2000 | Cyrus et al. | ................ 446/444 |

FOREIGN PATENT DOCUMENTS

EP 0 479 735 4/1992

\* cited by examiner

Primary Examiner—Avraham Lerner
(74) Attorney, Agent, or Firm—Lee, Mann, Smith, McWilliams Sweeney & Ohlson

(57) ABSTRACT

The invention concerns a steering arrangement (1) for a vehicle, in particular for an automotive machine, with a steering drive (4) controlled by a steering unit (8). In a steering arrangement of this kind, it is endeavoured to make the steering less straining for the operator. For this purpose the steering unit (8) has a keyboard (9) instead of a steering handwheel.

13 Claims, 1 Drawing Sheet

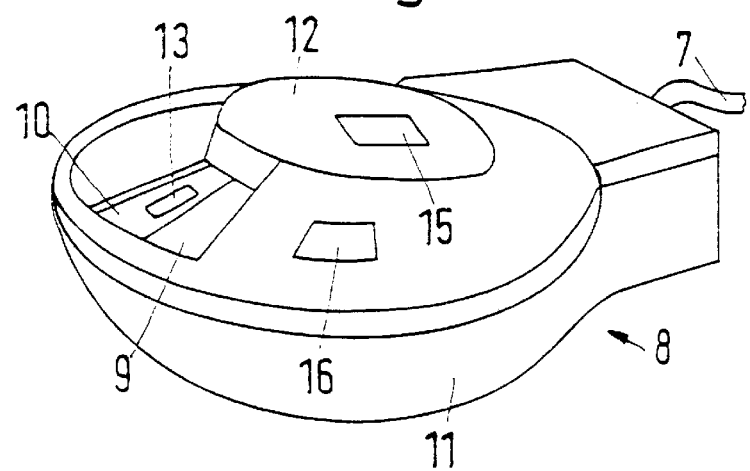
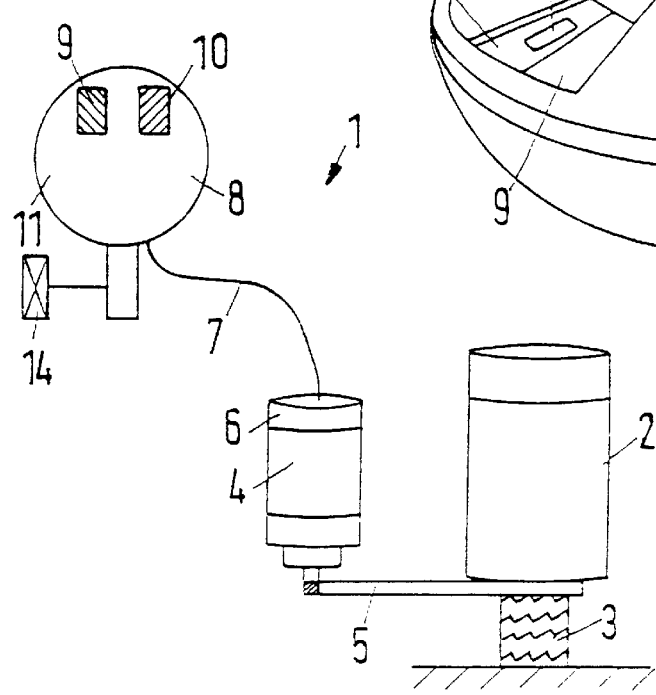
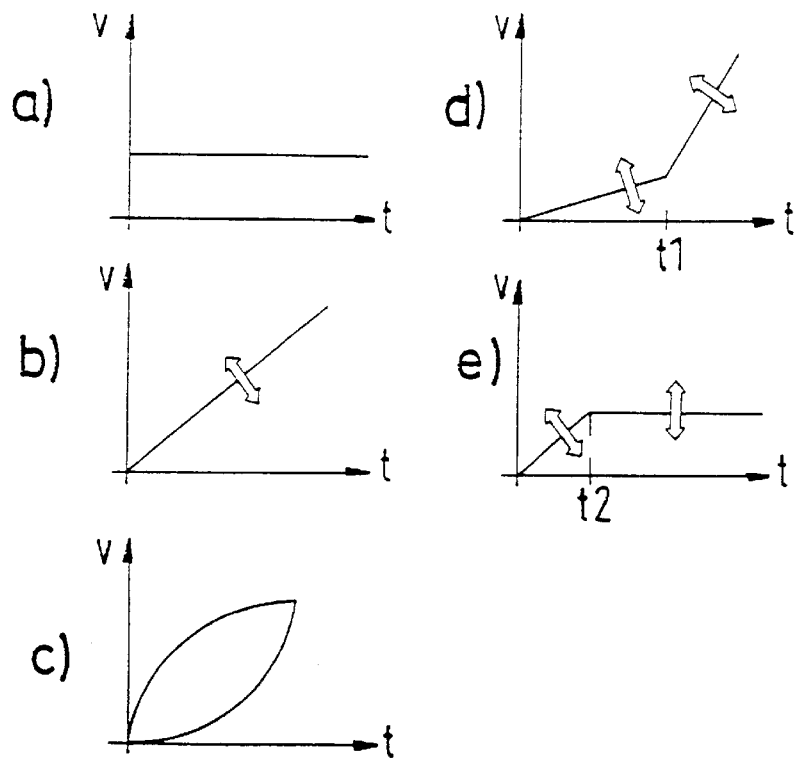

STEERING ARRANGEMENT FOR A VEHICLE

The invention concerns a steering arrangement for a vehicle, in particular for an automotive machine, with a steering drive controlled by a steering unit.

In automotive machines, for example fork lift trucks, used in warehouses, a relatively large number of steering operations must be performed in the course of a working day or a work shift, during which steering operations the driver or the operating person effects a change of direction by operating a steering handwheel. The steering handwheel can act directly or indirectly upon the steering drive, for example a hydraulic motor.

To ease the work for the operating person, the steering handwheels known from normal motor cars have earlier been replaced by the so-called "mini steering wheels". This change was based on considerations about the fact that it would save force for the operating person, if the steering movement could be performed by means of one hand, and substantially by the forearm area and the hand. Because of the reduced size of the mini steering wheel the required movement is substantially shorter.

However, it has turned out that also the mini steering wheel only offers a limited improvement of the working conditions. The force to be used by the operating person for the movements is in fact reduced. However, when the number of movements exceeds 10 to 20 times per minute, elbows and forearms are increasingly exposed to injuries. But a normal working day with fork lift trucks cannot be managed with less movements.

The purpose of the invention is to design a steering, which is less straining for the operator.

In a steering arrangement of the kind mentioned in the introduction, this task is solved in that the steering unit has a keyboard instead of a steering handwheel.

The operation of a keyboard normally only requires moving the fingers. During this operation, forearm and elbow can rest. It has been established that only 10 to 20 movements of elbow and forearm are allowed per minute, to avoid the risk of damage. However, fingers can perform up to 200 movements per minute without showing signs of damage. When considering that, for example with fork lift trucks in warehouses, the typical movement pattern comprises that the driver picks up, ranges and puts down a palette, often requiring direction changes of the fork lift truck by approximately 90°, which means three to five rotations of the mini steering handwheel, it can be imagined that the replacement of the steering handwheel by a keyboard does not reduce the number of required movements, however, it means that the movements are performed by the fingers, not by the elbow and the forearm.

The use of keyboard-operated steering units in the vehicle field is known per se. U.S. Pat. No. 5,035,439 shows a steering unit, with which the rear wheels of an articulated vehicle trailer can be weight relieved and then deflected, to manage sharp bends. However, this steering unit is only used for special purposes. Otherwise, the tractor truck is steered by means of a normal steering handwheel.

EP 0 479 735 A2 shows an electric car, the tailgate of which is also provided with a keyboard, by means of which the vehicle can be moved by inching. Normally, the vehicle is steered by a steering handwheel, like a normal car.

However, in connection with parking, the driver can leave the vehicle, and park it in even narrow parking spaces by means of the additional keyboard on the back.

Preferably, the keyboard has at least two direction-determining keys. The operation of one key causes, for example, a deflection of the steering drive to the left. The other key causes a corresponding movement to the right. This is most similar to the feeling of a driver, so that also with regard to feeling the keyboard can replace the steering handwheel.

Preferably, the keyboard has resting keys, which need a predetermined force to be activated. There is no reason why the direction-determining keys should not also be the resting keys. They permit the driver or the operator to let his hand, or at least his finger, rest on the keys during normal driving, without risking an operation of the keys. The predetermined force required for the operation is thus larger than the weight force of the finger or the hand, respectively, of the operator. Only when the driver wants a direction change of the vehicle, he deliberately activates the key to initiate the corresponding steering movement. Thus, an activation of the key does no longer require a movement of the finger towards the keys. On the contrary, the finger can remain on site and rest. This additionally increases the comfort of the steering unit.

In an alternative or additional embodiment, the keyboard can have pressure-sensitive keys, whose output signal depends on the pressure acting upon them. For example, the output signal can be the more powerful, the more the keys are pressed. The more powerful the output signal is, the higher can, for example, the angle speed be, with which the steering drive moves the steered wheel.

In a preferred embodiment the keyboard has a dead man's button. Such a dead man's button must, for example, be activated by the driver from time to time, to show that the driver is still in control of the vehicle. When this activation does not occur, a warning signal sounds, and the vehicle is then inactivated, that is, the vehicle stands still. This is an additional security aspect, which is difficult to realise in connection with a steering handwheel, as normally the operator does not have a defined working point on the steering wheel.

Preferably, at least one key of the keyboard has a detection unit for at least one person-specific feature, particularly a finger-print. This does not only provide an anti-theft. It also permits the direct insertion of certain driver or person dependent parameters in the steering unit, without requiring additional activities from the operator. The moment the detection unit recognises a certain operator, it can activate the programme stored for this certain operator. The most simple case could be a change from right-hand to left-hand operation or vice versa. However, it is also possible that each operator has a preferred driving pattern, which can be activated with simple key operating combinations, enabling a distinguishing between the individual driving patterns from person to person.

Preferably, the keyboard has a handhold area with a feedback device. The handhold area serves the purpose of supporting the hand of the operator. During operation, it must thus be assumed that the hand of the operator lies on or at the handhold area. When now the feedback device offers the opportunity of sending messages to the operator, a feedback acting upon the person can be provided here. For example, the feedback device can be used to inform the driver that the steered wheel has reached its end position or that the permissible steering speed has been exceeded, if required also in dependence on the vehicle speed.

In a particularly preferred embodiment it is provided that the feedback device has a vibration producing arrangement and/or an attemperation arrangement. A vibration producing arrangement makes the handhold area vibrate slightly, but enough to be felt by the driver. If required, the oscillation amplitude or the frequency can be changed, to indicate different hazard or limit situations. Also with the attemperation arrangement a similar signal can be achieved. When the handhold area is cooled or heated by a few degrees, the driver becomes a clear signal of a certain operating behaviour.

Preferably, the keyboard is arranged in a housing, which has a BUS-connection. In this case, control electronics can be provided in the housing, which plot the operation of the keys, and, if required, analyse and evaluate it. In this case, signals are transmitted to the steering drive via the BUS-arrangement, for example a CAN-BUS, said steering drive having a corresponding BUS-connection. When using a hydraulic steering drive, the BUS can also be used for direct activation of a proportional valve. On the other hand, the BUS can also serve the purpose of feedback and, for example, operate the feedback device.

In a preferred embodiment the keyboard is connected with a function generator, which, in dependence of a key operation, causes a time and/or movement dependent operation of the steering drive. In the most simple case, the steering drive is operated in one direction for as long as the corresponding direction key is pressed. When the key is released, the steered wheel remains in the desired position. By means of the function generator, however, the resetting can be simplified, in that the steered wheel is returned to the neutral or the straight ahead position, when both keys of the keyboard are pressed simultaneously. In this case it is even sufficient to press both keys simultaneously or almost simultaneously and then release them. Of course, it is also possible to hold both keys down simultaneously to bring the steered wheel back to the straight ahead position. When the wheel has reached the straight ahead position, the turning of the steered wheel will be interrupted, no matter if the keys are still pressed. It can also be provided that the steering speed is increased concurrently with the duration of the key pressing, or that the steering speed is high at the beginning and then reduced, or vice versa. The steering speed, that is, the speed of the angle movement of the steered wheel, can also be adapted to the speed and/or the load of the vehicle. For all these functions, the function generator is a valuable accessory.

It is particularly preferred that the function generator has an inlet with a time demodulator, which, on a key operation, opens a time window, in which an additional key operation causes a deviating deflection of the steering drive. A time demodulator increases the number of pieces of information, which can be transferred to the steering drive from the keyboard. This can, for example, be compared with the mouse of a personal computer (PC). On a computer mouse you can click once or twice, and this causes the PC to react differently. In the same way, double clicking of a direction key can cause that the wheel is steered to its end position in the corresponding direction, regardless of the initial position of the steered wheel. With a double clicking a "precision steering" can also be started, with which the steered wheel is moved at reduced steering speed. The double clicking can also cause the wheel to go to a different end position than a single clicking. Preferably, the reaction behaviour of the steering unit is programmable.

In the following the invention is described on the basis of preferred embodiments in connection with the drawings, showing:

FIG. 1 a schematic view of important components of a steering arrangement

FIG. 2 a steering arrangement

FIG. 3 various function courses for the angle speed over the time.

FIG. 1 shows part of a steering arrangement 1. On the chassis 2 of a vehicle, not shown in detail, for example a fork lift truck with three wheels, one wheel 3 is supported so that its angle alignment can be changed. The position shown is the neutral or straight ahead position, in which the wheel can be seen from behind.

To displace the wheel 3, a steering drive 4, in this case a hydraulic motor, is provided, which is connected with the wheel 3 by way of a chain 5 or a corresponding belt drive. The steering drive 4 has a valve 6, for example a direction-dependently controlled proportional valve, which controls the supply of hydraulic fluid to the steering drive 4. Of course, the steering drive can also be provided with another motor, for example an electric motor supplied from a frequency converter. If required, the control arrangement required for the electric motor can also be controlled direct from the keyboard.

Via a BUS-cable 7, for example a CAN-BUS, the steering drive 4, or rather, its valve 6, is connected with a steering unit 8, which is shown in detail in FIG. 2. The steering unit 8 replaces the usually provided steering handwheel or mini steering handwheel. Apart from the steering unit 8, no further possibilities of controlling the steering drive 4 are available.

The steering unit 8 has two direction keys 9, 10 in a housing 11. The left direction key 9 is provided for steering the wheel 3 to the left, whereas the right direction key is provided for steering the wheel 3 to the right.

The direction keys 9, 10 are made as resting keys. An operator can place his hand on a resting surface 12, for example with the palm. Thus, the fingers are placed on the direction keys 9, 10. The operation of the direction keys 9, 10, however, requires a force, which exceeds the weight force of the fingers. If required, the force needed for operation can be adjusted. This adjustment may even be performed automatically.

For this purpose, the direction key 10 comprises a finger-print detection unit 13, which detects and identifies the finger-print of the middle finger of a right-handed operator. By means of this finger-print, the steering unit can set various person-dependent programmes, for example the required operating force for the direction keys 9, 10 or a steering behaviour wanted by the corresponding operator. Instead of a finger-print detection unit, the direction key 16 can have a sensor, which detects the skin humidity or the skin temperature of the operator, when this is sufficient to distinguish between several operators. In principle, any sort of sensor can be imagined, which permits a reliable distinguishing between different persons.

Additionally, the housing 11 of the steering unit 8 has two feedback units. One is shown in FIG. 1 as a vibration drive 14, which can make the housing 11 oscillate, for example when the wheel 3 is in an end position. An additional feedback unit is provided in the shape of a plate 15, on which the palm of the operator rests. The temperature of this plate 15 can be slightly changed, for example by means of heating by an electrical resistor. The temperature increase required can be relatively low, that is, a few ° C. With a feedback unit of this kind, a certain state or a certain position of the steered wheels can be reported to the driver or operator. Of course, the vibration producing device 14 and the temperature increasing device 15 can be used together.

Finally, a dead man's button 16 is arranged on the housing 11, which button is operated by the thumb in the case of a right-handed person, when the hand of the operator is placed on the resting surface 12.

Now, various conditions can be set for the operation of the dead man's button 16. For example, it can be prescribed that it must be pressed periodically. When this pressing does not take place, the vehicle is stopped.

Thus, various steering programmes can be realised by means of the steering unit 8 shown.

FIG. 3a shows a first possibility. When one of the direction keys 9, 10 is pressed, the wheel 3 moves with constant angle speed for as long as the corresponding direction key is pressed. When the direction key is released, the angle movement of the wheel 3 stops. By means of the other direction key, the wheel can be returned to its neutral position. However, it is also possible to press both direction keys at the same time, to effect the return of the wheel 3 to its neutral or straight forward position.

FIG. 3b shows that the angle speed, with which the wheel 3 is steered, increases concurrently with the increase in the time of pressing the direction keys 9, 10. In other words, the steering of the wheel 3 is very slow at the beginning of the key pressure, whereas it starts moving faster, the longer the key is pressed. The double arrow indicates that the inclination can be changed. For example, the inclination can be person-dependent.

FIG. 3c shows two different possibilities. The upper curve shows a deflection of the wheel 3, which happens rather fast, that is at a high speed v, at the beginning of a key pressure, whereas it increases with a lower inclination on a longer duration of key pressing. The lower curve shows the opposite operation case, that is, the deflection speed of the wheel 3 is low at the beginning and then increases rapidly.

FIG. 3d shows that initially the deflection speed increases slowly, and then, from a certain time t1, increases at a higher speed. The double arrows indicate that the individual inclinations can be changed.

FIG. 3e shows that initially the speed increases, and then, at a certain time t2, remains constant.

However, the direction keys 9, 10 cannot only be used to initiate or maintain a steering movement of the wheel 3 by means of a simple key pressing. Each direction key 9, 10 can also be pressed twice, like the double clicking of a PC mouse. In this case, the wheel can, for example, be driven to the corresponding end position, independently of the angle position in which it was earlier. When both keys are pressed simultaneously, the wheel is steered to its neutral position. The opportunity of double clicking multiplies the number of orders, which can be sent to the steering unit 8 by means of the keys 9, 10.

What is claimed is:

1. Steering arrangement for a human-occupied vehicle having a steering drive controlled by a steering unit operated by a human occupant, the steering unit having only a keyboard instead of a steering handwheel for steering control of the vehicle, said keyboard having at least one feedback device acting on the human occupant.

2. Steering arrangement according to claim 1 in which the keyboard has at least two direction determining keys.

3. Steering arrangement according to claim 1 in which the keyboard has resting keys, which need a predetermined force to be activated.

4. Steering arrangement according to claim 1 in which the keyboard has pressure-sensitive keys, whose output signal depends on the pressure acting upon them.

5. Steering arrangement according to claim 1 which the keyboard has a dead man's button.

6. Steering arrangement according to claim 1 which at least one key of the keyboard has a detection unit for at least one person-specific feature.

7. Steering arrangement according to claim 6 in which the person-specific feature is a fingerprint.

8. Steering arrangement according to claim 1 in which the keyboard has a hand rest area, and said feedback device is located in said hand rest area.

9. Steering arrangement according to claim 1 in which the feedback device comprises a vibration producing arrangement.

10. Steering arrangement according to claim 1 in which the feedback device comprises a temperature increasing device.

11. Steering arrangement according to claim 1 which the keyboard is arranged in a housing having a BUS connection for operating a steering drive.

12. Steering Arrangement according to claim 11 in which the keyboard is connected to a function generator, which, independent of a key operation, causes at least one of a time and movement dependent operation of the steering drive.

13. A steering arrangement for a human-occupied vehicle having a steering drive controlled by steering unit operated by a human occupant, the steering unit having only a keyboard instead of a steering handwheel for steering control of the vehicle, in which the keyboard is connected to a function generator, which, independent of a key operation, causes at least one of a time and movement dependent operation of the steering drive, the function generator having an inlet with a time demodulator, which, on a key operation, opens a time window, in which an additional key operation causes a deviating deflection of the steering drive.

\* \* \* \* \*